United States Patent

[11] 3,578,067

[72] Inventor Seymour Schlosberg
East Brunswick, N.J.
[21] Appl. No. 53,808
[22] Filed July 10, 1970
[45] Patented May 11, 1971
[73] Assignee R. Gelb & Sons, Inc.

[54] SELF-COOLING MECHANICAL SEAL LUBRICATOR
7 Claims, 4 Drawing Figs.
[52] U.S. Cl. ............................................. 165/39,
165/106, 165/146, 165/157, 184/1
[51] Int. Cl. ............................................. B60h 1/00
[50] Field of Search........................................ 165/47,
106, 39, 107, 164, 157, 146; 184/96 (Cursory)

[56] References Cited
UNITED STATES PATENTS
3,194,342 7/1965 Heim............................ 184/1

Primary Examiner—Charles Sukalo
Attorney—Pennie, Edmonds, Morton, Taylor and Adams ABSTRACT: Apparatus for lubricating a mechanical seal between a rotatable shaft and its housing comprises a fluid-tight reservoir. A tubular member is disposed within the reservoir and is secured to an upper end wall of the reservoir to define therewithin a lubricant-cooling chamber. The lower end portion of the tubular member is disposed sufficiently above a lower end wall of the reservoir to permit circulation of lubricant between the reservoir and the cooling chamber. A lubricant return conduit extends upwardly through the lower end wall into the cooling chamber and terminates at a point sufficiently below the upper end wall to permit circulation of returned lubricant throughout the cooling chamber. Means are provided for cooling the returned lubricant as it circulates downwardly within the cooling chamber. In operation, the reservoir is filled and gas under pressure is introduced therein to force the lubricant within the cooling chamber upwardly to a level sufficient to provide adequate heat transfer from the returned lubricant to the cooling means.

PATENTED MAY 11 1971 3,578,067
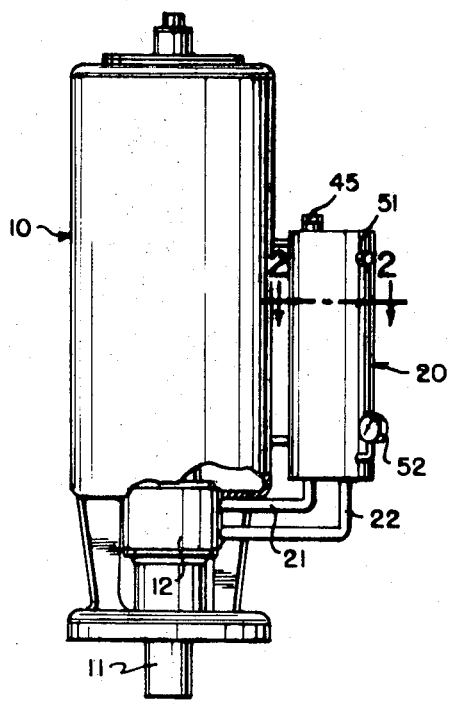
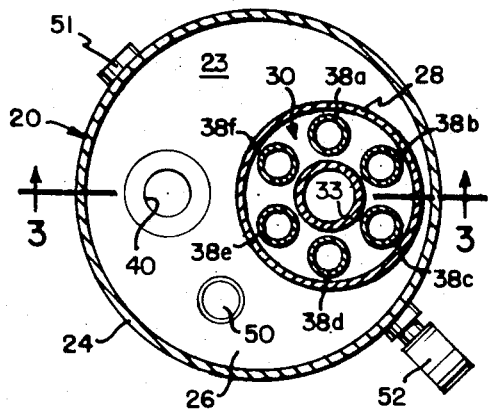
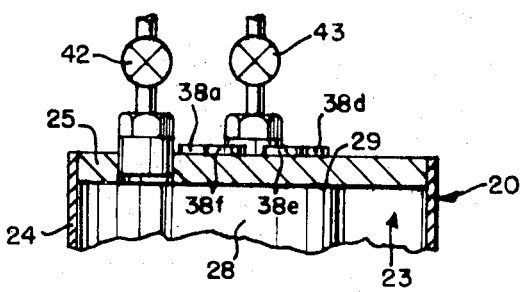
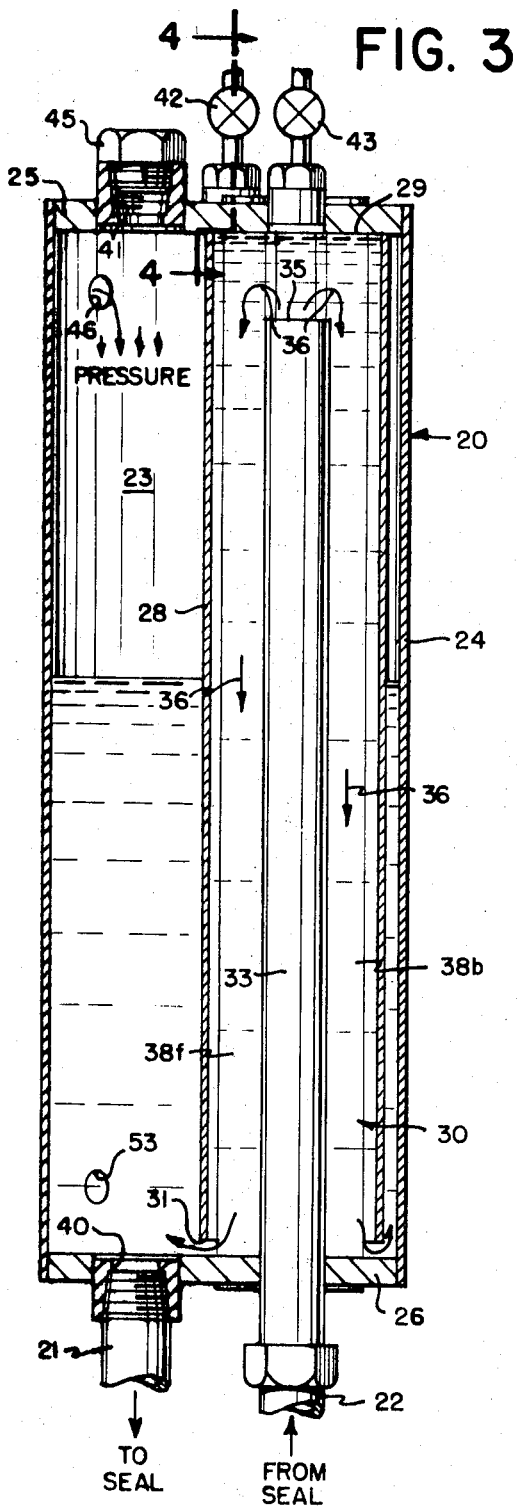
INVENTOR.
SEYMOUR SCHLOSBERG
BY Pennie Edmonds,
Morton, Taylor & Adams
ATTORNEYS

SELF-COOLING MECHANICAL SEAL LUBRICATOR

BACKGROUND OF THE INVENTION

The present invention relates to a lubricating apparatus and, more particularly, to apparatus for lubricating the mechanical seal between a rotatable shaft and its housing.

The manufacture of many compositions of matter requires continuous agitation of contents of a reactor vessel which is sealed and maintained under superatmospheric pressure. Accordingly, not only must the area about the point of entry of the rotatable agitator shaft be sealed to prevent the escape of liquid contents of the reactor but also sufficient lubrication must be provided for the shaft and its housing. The usual expedients relied upon for these purposes include stuffing boxes and double mechanical seals. With respect to the double mechanical seal, cooling of the lubricant presents a substantial problem. Natural convection cooling of lubricant under pressure as well as cooling of lubricant by positive water circulation have been attempted with limited success because the former technique requires a bulky and expensive heat exchanger and the latter necessitates the use of a separate water circulation system. It is further known to promote circulation of the lubricant by creating a pressure differential in the area between the rotating shaft and its housing as shown in U.S. Pat. No. 3,489,419 but the associated lubricant-cooling system is both bulky and expensive. Additional efforts to cool the lubricant for a double mechanical seal are disclosed in U.S. Pat. Nos. 3,005,518 and 3,194,342.

SUMMARY OF THE INVENTION

The present apparatus for lubricating a mechanical seal between a rotatable shaft and its housing comprises an enclosed, fluidtight, lubricant reservoir which includes a peripheral sidewall and axially spaced upper and lower end walls. A tubular member is disposed within the reservoir and is secured in fluidtight relationship to the inside surface of the upper end wall to define therewithin a lubricant-cooling chamber. The tubular member extends downwardly and substantially parallel to the sidewall and its lower end surface is open and is disposed sufficiently above the inside surface of the lower end wall to permit circulation of the lubricant between the reservoir and the cooling chamber. A lubricant return conduit is disposed within the cooling chamber and extends downwardly through the lower reservoir end wall. The return conduit outlet is disposed sufficiently below the inside surface of the upper reservoir end wall to permit circulation of returned lubricant throughout the cooling chamber. Means are provided for cooling the lubricant as it circulates downwardly within the cooling chamber as well as means for introducing gas under pressure into the reservoir to raise the lubricant in the cooling chamber to a level sufficient to provide adequate heat transfer from the returned lubricant to the cooling means.

The present lubricating apparatus is inexpensive, efficient and compact. A sufficient quantity of cooled lubricant is always available for circulation to the mechanical seal because the lubricant level in the cooling chamber is constantly maintained at a substantially fixed level as long as the lubricant level in the reservoir is above the lower portion of the internal tubular member. Loss of lubricant from the system will not adversely affect cooling efficiency because any such loss will be indicated solely by a drop in the reservoir lubricant level.

BRIEF DESCRIPTION OF THE DRAWINGS

FIG. 1 is an elevation of a conventional sealed reactor in combination with the mechanical seal lubricating apparatus of the present invention;

FIG. 2 is a sectional view of the present lubricating apparatus taken substantially along line 2–2 of FIG. 1;

FIG. 3 is a sectional view of the present lubricating apparatus taken substantially along line 3–3 of FIG. 2; and FIG. 4 is a sectional view of the present lubricating apparatus taken substantially along line 4–4 of FIG. 3.

DESCRIPTION OF THE PREFERRED EMBODIMENT

As shown in FIG. 1, the present apparatus for lubricating a mechanical seal between a rotating shaft and its housing is particularly suitable for use with a reactor 10 which is maintained under superatmospheric pressure during mixing of its contents by an agitator (not shown). The agitator is driven by a shaft 11 which rotates in a housing 12. Generally, the contents of the reactor 10 are prevented from escaping along the rotating shaft 11 by a double mechanical seal supported within the housing 12. The seal, which is of conventional design and not related to the primary novel aspects of the present invention, will not be described in detail herein. Such double mechanical seal requires the presence of a lubricant within the cavity between the rotatable shaft 11 and its housing 12. The lubricant should be under pressure greater than the pressure within the reactor 10 to prevent leakage of the contents of the reactor along the shaft 11. Because of friction and other factors, substantial heat is generated at the seal and means for cooling the lubricant is thus required. In the present system, such lubricant is circulated between the housing 12 and the present lubricating apparatus 20, where it is cooled, through feed and return lines 21, 22, respectively.

Referring particularly to FIGS. 2 through 4, the present apparatus for lubricating a mechanical seal between a rotating shaft and its housing 20 comprises an enclosed, fluidtight, lubricant reservoir 23 which includes a peripheral sidewall 24 and axially spaced upper and lower end walls 25 and 26, respectively.

As shown best in FIGS. 2 and 3, a tubular member 28 is disposed within the reservoir 23 and extends downwardly and substantially parallel to the reservoir sidewall 24. An upper portion 29 tubular member 28 is secured in fluidtight relationship to the inside surface of the upper end wall 25 to define therewithin a cooling chamber 30. A lower end portion 31 of the tubular member 28 is open and terminates sufficiently above the inside surface of the lower end wall 26 to permit circulation of lubricant between the reservoir 23 and the cooling chamber 30. Although tubular members of any shape may be employed, preferably, both the reservoir sidewall 24 and the tubular member 28 are substantially cylindrical in configuration.

A lubricant return conduit 33 is disposed substantially coaxially within the cooling chamber 30 and extends downwardly through the lower end wall 26. Suitable means are provided to connect the lubricant return conduit 33 to the return line 22. The lubricant return conduit 33 terminates within the cooling chamber 30 at an outlet 35 which is disposed sufficiently below the inside surface of the upper end wall 25 to permit circulation of the returned lubricant throughout the cooling chamber 30 as indicated generally by arrows 36.

A plurality of cooling tubes 38a through 38f, inclusive, are disposed within the cooling chamber 30 as shown in FIGS. 2 and 3. The cooling tubes 38a through 38f, inclusive, extend completely through both the upper and lower end walls 25, 26, respectively, and are open to the ambience at either end to permit continuous natural or forced convection of a cooling fluid, preferably the surrounding atmosphere, therethrough.

In operation, the lubricating apparatus 20 is connected to the housing 12 through the feed and return lines 21, 22, respectively. Feedline 21 is secured in a conventional manner to a lubricant outlet opening 40 which is provided in the lower reservoir end wall 26 and return line 22 is secured in a conventional manner to the end of the lubricant return conduit 33 which extends downwardly through the lower reservoir end wall 26.

Thereafter, lubricant is introduced into the reservoir 23 through a lubricant fill opening 41 which is provided in the upper reservoir end wall 25. As shall be explained in detail, infra, a sufficient quantity of lubricant is introduced to fill completely the cooling chamber 30 and to substantially fill the reservoir 23. To assure proper filling, both a reservoir vent 42 and a cooling chamber vent 43, each provided in the upper reservoir end wall 25, are opened during this interval. When the reservoir has been filled to the proper level, the fill opening 41 is sealed with cap 45 and the reservoir vent opening 42 is also closed. However, the cooling chamber vent 43 remains open. Next, a gas, preferably air, is introduced into the reservoir 23 through opening 46 in the reservoir sidewall 24 to cause the lubricant level in the cooling chamber 30 to rise until the chamber 30 is substantially completely filled. At this point, the cooling chamber vent 43 is sealed and the gas pressure in the reservoir 23 is increased until the lubricant is under pressure sufficient to prevent leakage of the reactor contents along the shaft 11.

Once the cooling chamber 30 is filled and sealed, the lubricant level remains substantially constant regardless of variations in the lubricant level in the reservoir 23 provided, however, that the latter level remains above the lower end portion 31 of the tubular member 28. In this manner sufficient lubricant always remains in the cooling chamber 30 to provide adequate heat transfer from the returned lubricant to the cooling tubes 38a through 38f, inclusive.

Cooling of hot lubricant, which recirculates from the housing 12 through the return line 22 and the return conduit 33 and into the upper portion of the cooling chamber 30 via the return conduit outlet 35, is achieved by heat transfer to the cooling tubes 38a through 38f, inclusive. The heat is ultimately dissipated by circulation of air through the cooling tubes. As the lubricant cools, it tends to circulate by natural convection downwardly through the cooling chamber 30 in proximity to the cooling means as shown by arrows 36. By the time the lubricant reaches the outlet 40 to be recirculated through feedline 21, it is completely cooled.

If required, lubricant may be drained from the reservoir through an opening 50 provided in the lower reservoir end wall 26. Additionally, a conventional lubricant level sight glass 51 and a pressure gauge 52 may be received by openings 46 and 53 which are provided in the reservoir sidewall 24.

I claim:

1. Apparatus for lubricating a mechanical seal between a rotatable shaft and its housing comprising an enclosed, fluidtight, lubricant reservoir including a peripheral sidewall and axially spaced upper and lower end walls; a tubular member disposed within the reservoir and secured in fluidtight relationship to the inside surface of the upper end wall to define therewithin a lubricant-cooling chamber, the tubular member extending downwardly and substantially parallel to the sidewall, the lower end portion of the tubular member being open and disposed sufficiently above the inside surface of the lower end wall to permit circulation of the lubricant between the reservoir and the cooling chamber; a lubricant return conduit disposed within the cooling chamber and extending downwardly through the lower reservoir end wall, the return conduit outlet being disposed sufficiently below the inside surface of the upper reservoir end wall to permit circulation of returned lubricant throughout the cooling chamber; means for cooling the returned lubricant as it circulates downwardly within the cooling chamber; and means for introducing a gas under pressure into the reservoir to raise the lubricant in the cooling chamber to a level sufficient to provide adequate heat transfer from the returned lubricant to the cooling means.

2. Apparatus according to claim 1 wherein the upper reservoir end wall is provided with a lubricant fill opening, a reservoir vent opening and a cooling chamber vent opening; the lower reservoir end wall is provided with a lubricant outlet opening and a reservoir drain opening; and the gas introduction means comprise an opening in a reservoir wall.

3. Apparatus according to claim 1 wherein the lubricant-cooling means comprises a plurality of cooling tubes disposed within the cooling chamber and extending completely through both the upper and lower reservoir end walls.

4. Apparatus according to claim 1 wherein the reservoir sidewall and the tubular member are substantially cylindrical in configuration.

5. Apparatus according to claim 1 wherein the reservoir sidewall is provided with means for receiving a lubricant level sight glass.

6. Apparatus according to claim 1 wherein the reservoir is provided with means for receiving a gas pressure gauge.

7. Apparatus according to claim 1 wherein lubricant circulates by natural convection from the outlet of the return conduit, downwardly through the cooling chamber in proximity to the cooling means and through the lubricant outlet in the lower reservoir wall.

Disclaimer and Dedication 3,578,067.—*Seymour Schlosberg*, East Brunswick, N.J. SELF-COOLING MECHANICAL SEAL LUBRICATOR. Patent dated May 11, 1971. Disclaimer and Dedication filed Mar. 14, 1986, by the assignee, *De Dietrich (USA), Inc.*

Hereby disclaims and dedicates to the Public the remaining term of said patent.

[*Official Gazette May 13, 1986.*]